March 4, 1958  J. E. NITSCHE  2,825,185
METHOD OF SEALING DOUBLE GLAZED CELLS
Filed March 4, 1954
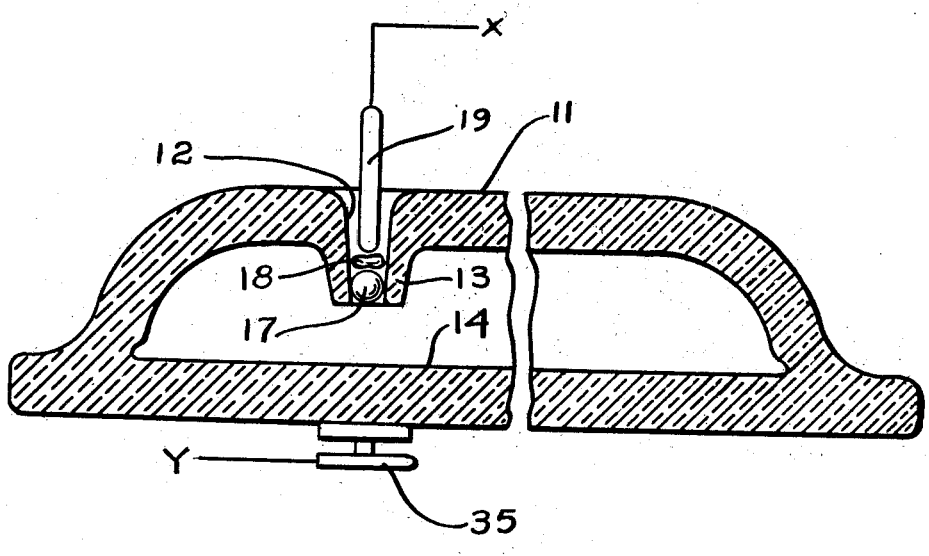
INVENTOR.
JOSEPH E. NITSCHE
BY
Rolf E. Schneider
ATTORNEY.

United States Patent Office 2,825,185
Patented Mar. 4, 1958

2,825,185

METHOD OF SEALING DOUBLE GLAZED CELLS

Joseph E. Nitsche, Corning, N. Y., assignor to Corning Glass Works, Corning, N. Y., a corporation of New York Application March 4, 1954, Serial No. 414,127

1 Claim. (Cl. 49—82)

The present invention relates to double-glazed cells or windows and has particular relation to the sealing of pores or vents employed for equalization of the pressures between the inside and the outside of such a cell or window.

A double-glazed window unit, which comprises two sheets of glass in spaced parallel relationship, is generally fabricated either by joining the glass sheets along their edges to a spacer of a metal or some other material or by fusing such sheets to each other along their edges as taught for example in Patent No. 2,389,360 to Edwin M. Guyer, Jesse T. Littleton and Morton R. Shaw, Jr. In the fabrication of such a unit in accordance with the latter procedure, the glass sheets are necessarily heated to a high temperature in order to effect the desired seal, with the result that the air between the glass sheets becomes highly heated and expands. To prevent collapse of the unit upon cooling to atmospheric temperature, it is necessary to provide a vent or pore in one of the sheets so that the pressures between the inside and the outside of the unit can be equalized.

As will be obvious, such vent or pore must be closed to prevent the entry of water vapor into the interior of the unit. While it would seem a relatively simple matter to close such a pore, such is actually not the case. Not only is it essential that such pore seal itself and remain intact throughout the useful life of the window unit, but it is also necessary to effect such closure without damage to the glass sheet containing the vent or pore. The magnitude of this problem will be fully appreciated when it is realized that not only is it desirable to employ an opening as small as possible but that, if such opening is closed after the glass sheets have been sealed together, such closure must be effected without reheating the entire unit.

The primary object of the present invention accordingly is the provision of an improved system for readily and simply effecting closure of such a pore without damage to the double-glazed window unit itself.

A further object of the invention is the provision of such a double-glazed window unit embodying an improved pore closure seal.

According to the invention, a glass sheet or plate to be employed as one wall of a double-glazed window unit is heated in a small area and is reshaped to form a tubular passage extending therethrough and projecting from one surface thereof to form a pore therein. After such sheet has been embodied in a double-glazed window unit with such tubular passage extending into the space between the two glass sheets, closure of the passage may be accomplished by means of a glass solder (a glass having a working point substantially lower than that of the glass from which the sheets are fabricated) and is advantageously effected by positioning a solder glass bead within the tubular passage at its inner end and suitably heating such solder glass bead until it fuses to the surrounding tubular wall. Heating of the solder glass bead can be readily accomplished by arranging a small mass of manganese dioxide or other high dielectric-loss material in association with the bead and including the bead and such material between the terminals of a suitable high-frequency current source. Preferably, the thermal expansion coefficient of the solder glass closely matches that of the glass sheets.

For a better understanding of the invention, reference is made to the accompanying drawing showing, in sectional elevation, a double-glazed window unit embodying a preferred form of the invention, one type of facility for applying heat to effect the closure of the seal being diagrammatically shown.

The double-glazed window unit shown in the drawing includes a sheet 11 provided with a vent or pore 12. Projecting into the space between sheets 11 and 14 of such unit is the tubular extension 13, which is coextensive with pore 12 and forms a tubular passage therewith. Such tubular extension may be formed in any suitable conventional manner and may be conveniently formed in the glass sheet prior to its assembly into the double-glazed unit by locally heating a small area of the sheet, forcing a suitable punch through such heated area to form an integral tubulation extending from one surface of the sheet, and appropriately heating the tip of such tubulation and blowing air therethrough.

To effect closure of such tubular passage, a bead 17 of a suitable solder glass is arranged in the bore thereof at its inner end and is heated until it softens and fuses to the inner surface of such tubular passage. Heating of the bead is appropriately effected by arranging a mass of a high dielectric-loss material 18 immediately over the bead and including such material in a high dielectric-loss circuit. Alternatively the dielectric-loss material may be embodied in or coated over the bead. The circuit shown includes one terminal X of a high-frequency current source connected to a probe electrode 19 projecting into association with such dielectric-loss material, the other terminal Y of such source being connected to a plate electrode 35 arranged next to the sheet 14 at a point opposite the inner end of the tubular extension 13. As will be appreciated, heating of the solder glass bead is effected by conduction.

The inner end of tubular extension 13 may alternatively be sealed by the use of high-frequency induction heating, in which case a metal is embedded in or otherwise associated with the solder glass bead, the metal being heated and the solder glass bead being thereby heated by conduction. The inner end of tubular extension 13 may also be sealed by means of any other suitable similar sealing medium. With the tubular extension projecting into the space between the two glass sheets, it will be appreciated that such sealing operation can be accomplished without excessive thermal shock to the glass sheet 11, which remains substantially at room temperature during such operation.

It will be further appreciated that, although the present invention has been shown as applied to a double-glazed window unit, it also finds utility in sealing similarly formed openings in other types of hollow glass bodies.

The utilization of induction heating to fuse a solder glass bead and thereby effect closure of a glass tubulation extending through an opening in a wall of a hollow glass body into the interior thereof is broadly claimed in the copending application of Morton R. Shaw, Jr., Serial No. 414,176, filed of even date herewith which issued June 11, 1957 as Patent No. 2,795,018.

I claim:

The method of closing the only remaining passage extending through a wall of a hollow glass body into the interior thereof, said passage being embodied in part in a glass tubulation occupying the cavity of the body, which includes introducing a bead of a solder glass into the outer end of the passage and positioning it in the inner end region of such passage, associating a high dielectric-loss material with the solder glass bead, and subjecting such material to the action of a high-frequency field to heat such material and thereby heat the solder glass bead by conduction and fuse the same to the surrounding passage wall.

References Cited in the file of this patent

UNITED STATES PATENTS

| | | |
|---|---|---|
| 1,165,951 | Dunlap | Dec. 28, 1915 |
| 1,911,410 | Valverde | May 30, 1933 |
| 2,093,567 | McCullough | Sept. 21, 1937 |
| 2,262,176 | Geiger et al. | Nov. 11, 1941 |
| 2,306,163 | Greifendorf | Dec. 22, 1942 |
| 2,398,737 | Elliot et al. | Apr. 16, 1946 |
| 2,473,860 | Cartun | June 21, 1949 |
| 2,492,162 | Litton | Dec. 27, 1949 |
| 2,688,824 | Badger et al. | Sept. 14, 1954 |
| 2,736,143 | Ford | Feb. 28, 1956 |

FOREIGN PATENTS

| | | |
|---|---|---|
| 433,489 | Great Britain | Aug. 15, 1935 |